(No Model.)  2 Sheets—Sheet 1.

J. LUCAS.
GRAIN SEPARATOR.

No. 317,813. Patented May 12, 1885.

WITNESSES:
P. B. Turpin.
O. M. Kramer.

INVENTOR:
John Lucas
By R. S. & A. P. Lacey
ATTYS (No Model.) 2 Sheets—Sheet 2.
J. LUCAS.
GRAIN SEPARATOR.
No. 317,813. Patented May 12, 1885.
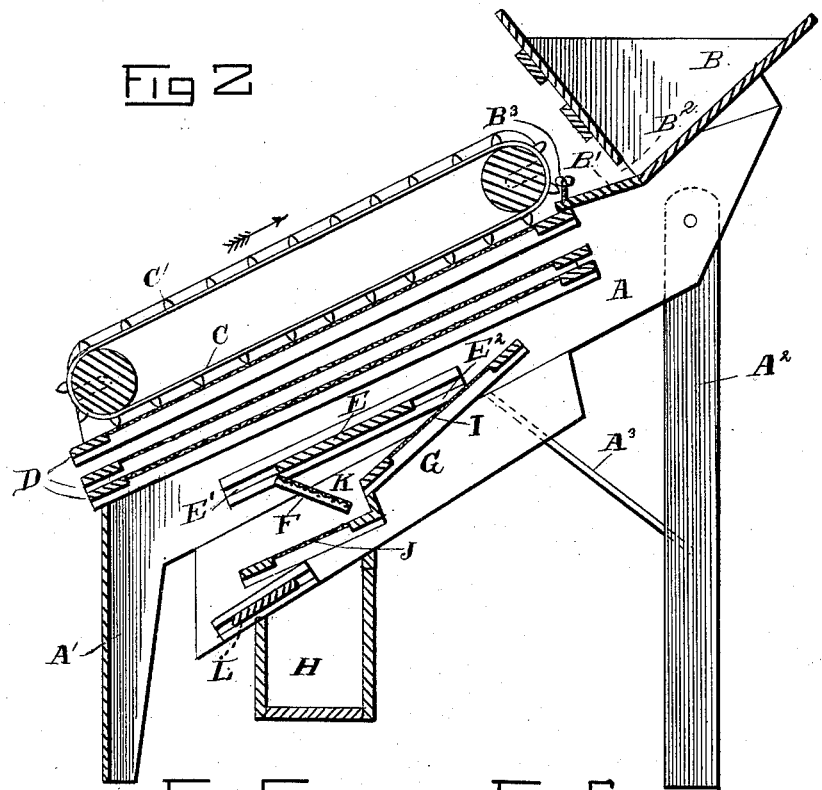
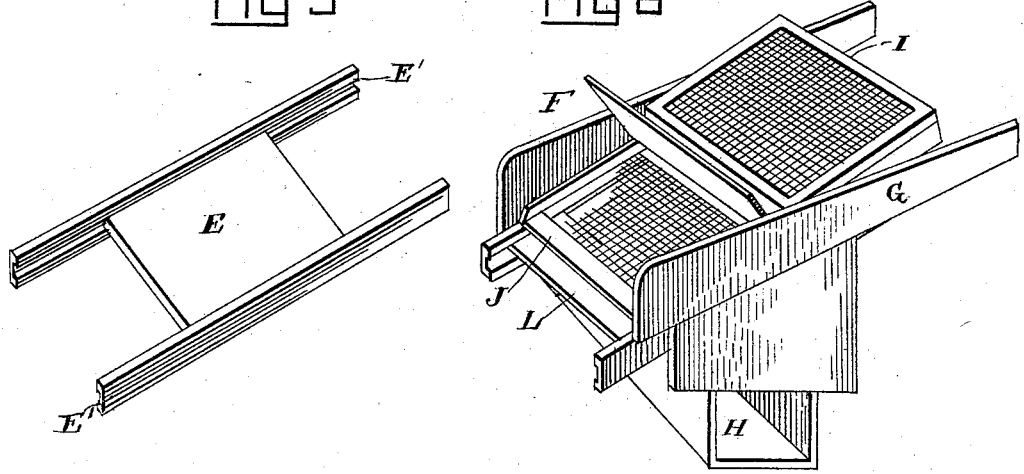
WITNESSES
R. B. Turpin.
O. M. Kramer.
INVENTOR
John Lucas
By R. S. & A. P. Lacey
ATTYS

UNITED STATES PATENT OFFICE.

JOHN LUCAS, OF HASTINGS, MINNESOTA.

GRAIN-SEPARATOR.

SPECIFICATION forming part of Letters Patent No. 317,813, dated May 12, 1885.

Application filed July 1, 1881. (No model.)

*To all whom it may concern:*

Be it known that I, JOHN LUCAS, of Hastings, in the county of Dakota and State of Minnesota, have invented new and useful Improvements in Grain-Separators, of which the following is a specification.

The object of this invention is to furnish a separator adapted to separate from wheat the oats, cockle, &c., which may be mixed with it.

It consists in the construction, combination, and arrangement of the several parts hereinafter described, and pointed out in the claims.

Figure 1:
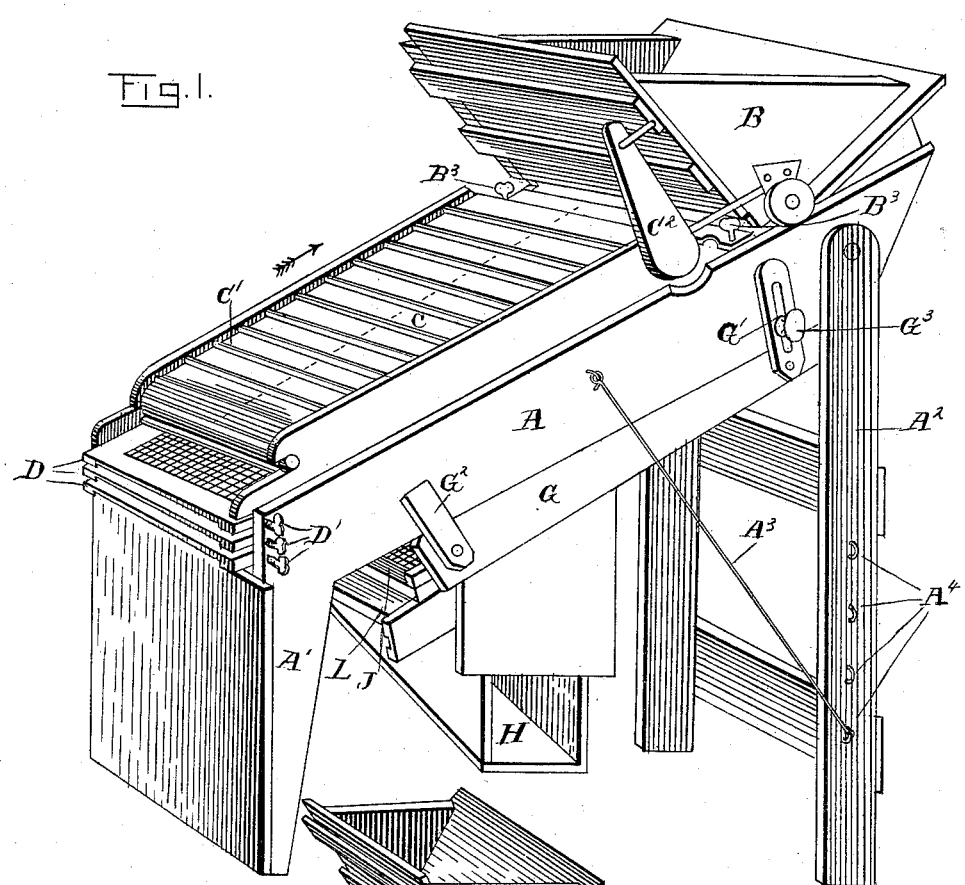
Figure 3:
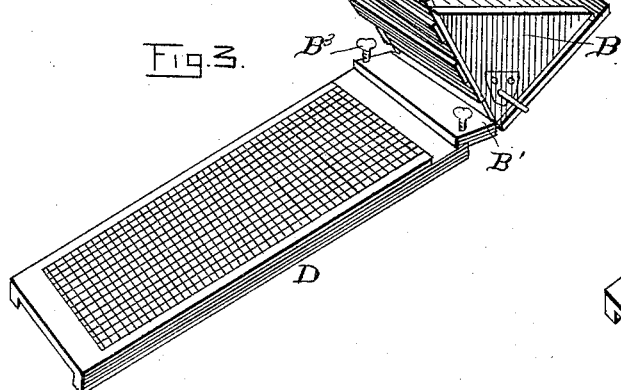
Figure 4:
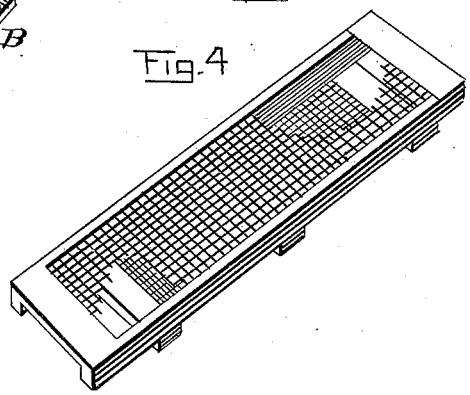

In the drawings, Figure 1 is a perspective view of my machine. Fig. 2 is a vertical section thereof, showing the relative arrangement of the sieves, &c. Fig. 3 is a detail perspective view showing the hopper, tilting valve, and sieve. Fig. 4 is a detail view showing two of the main sieves with different meshes in a single frame. Fig. 5 shows the cut-off board and its supports. Fig. 6 is a perspective view of the supplemental frame.

A is the main frame, supported on legs A' A². The longer legs A², which support the upper or feed end of the frame, are pivoted to the said frame and are held by hooked rods A³, engaging in staples A⁴, whereby they may be set outward or inward, and thereby lower or raise the feed end, as may be desired.

On the upper or feed end of the frame A, I place the hopper B, which is arranged to deliver the grain onto the sieves.

B' is a tilting valve, pivoted to the hopper just below the discharge-opening B², which extends outward from the hopper over the upper end of the first or top sieve. It is regulated by means of the thumb-screws B³, arranged at its ends. It may be set at any angle desired, so that it will permit a fast or slow feed.

C is the endless belt, provided with slats C', arranged in close proximity to the surface of the upper or top sieve. It is supported on rollers journaled in suitable bearings, and is operated by a crank, C². This belt and its arrangement with reference to the sieve have been shown and described in the Patent No. 274,797, granted to me March 27, 1883.

A series of inclined sieves, D, are supported in the casing and removably held therein by means of clamping-screws D', or in any other suitable manner desired. I have shown only three sieves. It will be understood, however, that where more are desired they can be added without involving a departure from the principles of my invention. It will be also understood that instead of supporting each of sieves D on a separate frame, two of same might be supported on a single frame, as is shown in Fig. 4. The upper ends of the sieves are arranged on a line below the discharge-opening of the hopper. These sieves are made of different degrees of fineness, whereby they are adapted to separate the various kinds of trash that may be mixed with the wheat.

Below the lower sieve I place a movable cut-off board, E, which slides in grooves E', formed in opposite sides of the frame A. This cut-off board can be moved to the upper ends of the grooves, or may be moved downward toward the lower ends thereof, so as to make a wider or narrower space, E², at its upper end, through which the cleaned wheat will fall onto the screen in the pendent frame, hereinafter described. The open space E² at the upper end of the cut-off E is contracted or enlarged according to the condition of the grain and the rapidity with which the separating process is forwarded. This cut-off E may be so tightly fitted in its guide-grooves as to remain at any desired point of adjustment; or set-screws or other expedients may be employed, as is obvious.

When the grain first drops onto the upper one of the sieves D, some portions of it will at once pass through to the second sieve, which in turn will permit a part to drop to the third sieve, and the latter will permit a small portion to pass through, which latter portion will be permitted to drop through the open space E² at the upper end of the cut-off E. This latter portion of grain, by the time it reaches the sieve in the pendent frame, will be perfectly clean, except some very small seeds and dust, which will descend with it. The grain which is caught by the cut-off E will be carried down and thrown with some force against an inclined deflector, F, which is so arranged as to deflect and deliver it into the main discharge-spout.

G is a pendent frame suspended by hangers

G' G² to the main frame A. The upper hangers, G', are slotted and held by a thumb-screw, G³, so that this end of the frame G may be raised or lowered to increase or diminish the pitch of the sieve carried by it.

H is the main discharge-spout. It is fixed to and forms a part of the pendent frame G, and it is so arranged as to receive the cleaned grain from the sieves.

I is an inclined screen placed in the upper or higher end of the frame G. Its lower end is arranged over the discharge-spout H. It receives the clean grain that drops through the sieves D and through the open space at the upper end of the cut-off E, and it permits the dust and small seeds to pass through to the floor as the grain passes down said screen I, while the pure wheat is carried and delivered thence onto the sieve J, through which it passes into the discharge-spout.

F is an inclined deflector, by preference a sieve, as shown in Fig. 2, fixed, preferably, to the frame G and inclined in the direction opposite to the plane of the incline of the screen I and of the cut-off E. Its upper end is placed close to the groove in which the cut-off E slides, while its lower end is over the discharge-spout and in close proximity to the lower end of the sieve I. It will be seen that this check-sieve and the lower end of the deflector I form a hopper-shaped receptacle, K, immediately over the discharge-spout. The force with which the grain is thrown against the deflector F will, when said part is made a sieve, cause dust, small seeds, &c., to be forced through, while the clean grain drops down to the delivery-spout.

J is a distributing-sieve supported in the pendent frame, arranged, as most clearly shown in Fig. 6, to slide over the upper end of the discharge-spout just below the discharge-opening of the hopper-shaped receptacle K, formed by the deflector F and sieve I. The grain passes through it into the discharge-spout. The special object of this distributing-sieve is to carry off any of the grains of wheat that may not have been hulled, and which may have fallen through the upper sieves, and to so distribute or scatter the grain that it will fall in a shower into the discharge-spout, and any dust that may be in the grain will thus be removed by a slight upward draft through the discharge-spout, which will carry it upward through the sieve J and to the rear or under side of the deflector F. The upward draft above referred to is not intended to be produced by blowers or fans, but is the natural draft common to passages or openings arranged in an approximately vertical position.

An inclined cut-off board, L, is supported in the frame G, and is adjustable to and from the upper side of the spout H, so it can be set to permit the good grain to drop into the spout H, while other grain that falls through nearer the lower end of the sieve D will be carried to a more distant point before it is deposited.

In the operation of this machine it will be understood that none of the sieves or other parts receive a shaking motion. With the exception of the belt C and its carrying-rollers, all the parts are motionless. Grain is separated more thoroughly by motionless machines. The grain moves by its own gravity, and the different grades more readily pass through the meshes of the sieve adapted for them, while the larger kernels pass farther along.

The two frames A and G have an adjustment independently of each other. The pitch of one can be increased, while at the same time the pitch of the other can be diminished. By this arrangement the grain can be caused to flow rapidly on the sieves D and slowly on the sieve I, or slowly on sieve D and rapidly on sieve I. The degree of filthiness of the grain often requires these opposite adjustments of the two frames.

It will be seen that the tilting valve B³ and the endless belt C are arranged relatively to each other, so that the slats C' pass in close proximity to the outer edge of said tilting valve. This serves to give better equalization to the quantity of grain held by each of the slats C'. The belt C revolves in the direction of the arrows, Fig 1, and the slats retard the descent of the grain on the uppermost sieve.

It will be seen from Figs. 2 and 6 that that portion of the open upper end of the discharge-spout in rear of the deflector F is not closed, but remains open to permit a free upward draft for carrying upward any dust that may have been held in the grain down to the distributing-sieve J.

Instead of making the deflector F in the form of a sieve, a smooth board may be employed, as shown in Fig. 6; but I prefer the use of a sieve, for thereby I secure additional means for the removal of filth from the grain.

By this machine I am enabled to remove every particle of filth and dust from the grain, so that the grain finally dropped into the spout H will be perfectly pure.

The several sieves D are so inserted that they may be removed easily and others of different degrees of fineness substituted, and the machine thus be made available for the purpose of cleaning, separating, or sorting grain.

Having thus described my invention, what I claim, and desire to secure by Letters Patent, is—

1. The combination of the sieves D, the adjustable cut-off E, the sieve I, the discharge-spout H, and the deflector F, arranged at the lower end of sieve I, and inclined in an opposite direction from said sieve I, substantially as set forth.

2. The combination of the sieve I, the deflector F, arranged at the lower end of and inclined in an opposite direction to sieve I, the sieve J, the spout H, and cut-off L, arranged between the spout and sieve J, and movable longitudinally below the latter, substantially as described, whereby the grain screened by sieve J may be divided into two portions, one of which is delivered into and the other carried beyond the spout, as and for the purposes specified.

3. The combination of the sieves D, the adjustable cut-off E, the sieve I, the deflector F, the sieve J, the spout H, and the adjustable cut-off L, substantially as set forth.

4. The combination of the main frame provided with sieves D, and having adjustable supports, whereby the said sieves D may be set at different angles, and the supplemental sieve-carrying frame suspended on the main frame and adjustable independently of the said frame, whereby the grain may be caused to flow rapidly on the sieves of one frame and slowly on those of the other, and vice versa, substantially as set forth.

JOHN LUCAS.

Witnesses:
ALBERT SCHALLER,
D. Y. CHAMBERLAIN.